Patented Jan. 10, 1928.

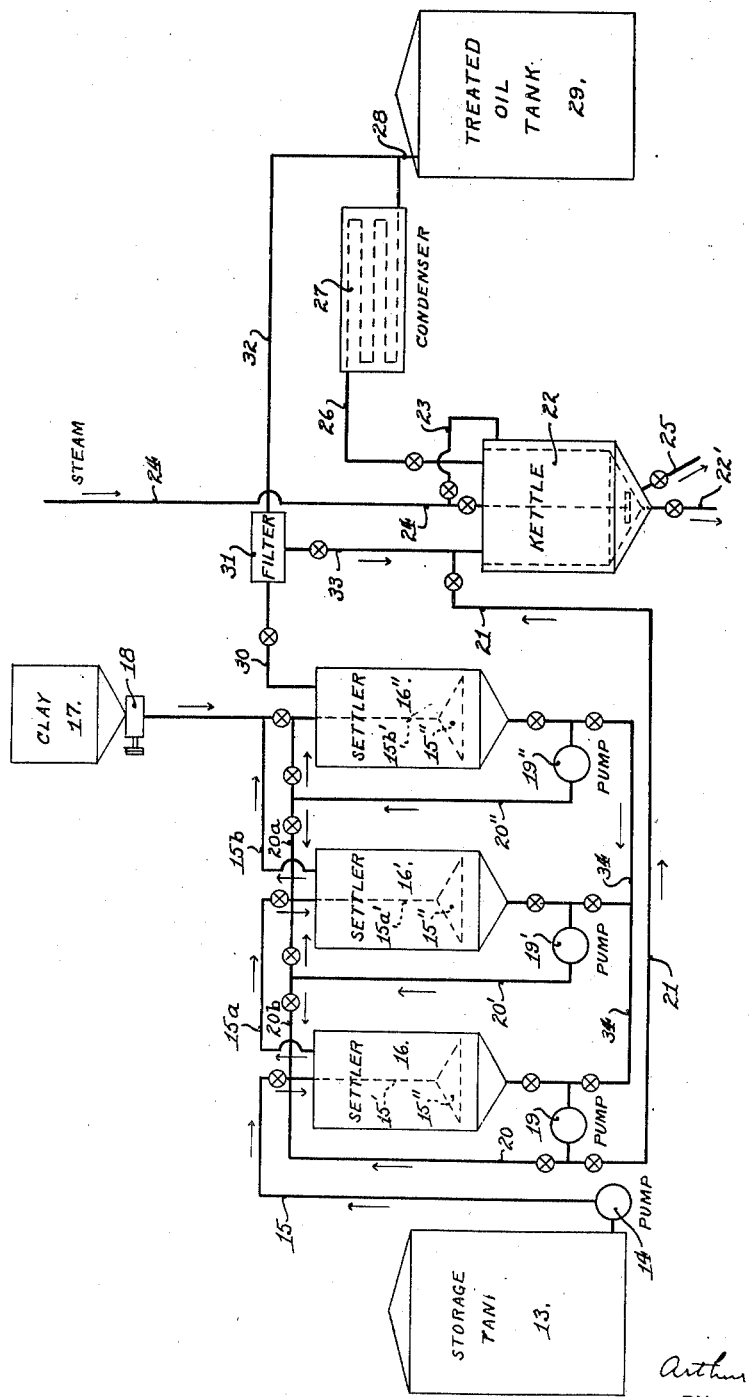

1,655,890

UNITED STATES PATENT OFFICE.

ARTHUR F. L. BELL, OF SAN FRANCISCO, CALIFORNIA, ASSIGNOR TO ASSOCIATED OIL COMPANY, OF SAN FRANCISCO, CALIFORNIA, A CORPORATION OF CALIFORNIA.

TREATING OILS.

Application filed August 11, 1924. Serial No. 731,302.

My invention relates, in general, to that treatment of oil which involves its subjection to a treating agent, and the subsequent separation of the treated oil from the treating agent.

In particular my invention relates to the treatment of refined petroleum oils or distillates, for example, gasoline, engine distillate, kerosene, etc., with any desirable end in view, such, for example, as the removal thereform of various objectionable substances and the clarifying and decoloring of said oils, the treating agent in such cases being selected according to the special result sought.

Examples of such treatment are the use of sodium plumbite to remove the sulfur from oils, so that the treated oil will be sweet and will meet the requirements of the so called "doctor" or corrosion tests; or the treatment of oils with clay to clarify and decolor them and remove the objectionable gums. It is in this connection that I shall herein describe my invention, as this is the special application I have in view, namely, the preliminary removal of the sulfur compounds if such be present, thereby avoiding the corrosive or deleterious effect upon the equipment used, and the subsequent removal of the coloring matter and gums, so as to produce a stable water white product.

It must be understood, however, that my invention is not confined to this sequence since, in case the oils being treated do not carry sulfur, there is no need for the preliminary treatment and, again, if the object be merely to remove the sulfur from such oils as carry it, such treatment may be carried out irrespective of any subsequent treatment.

Figure 1:
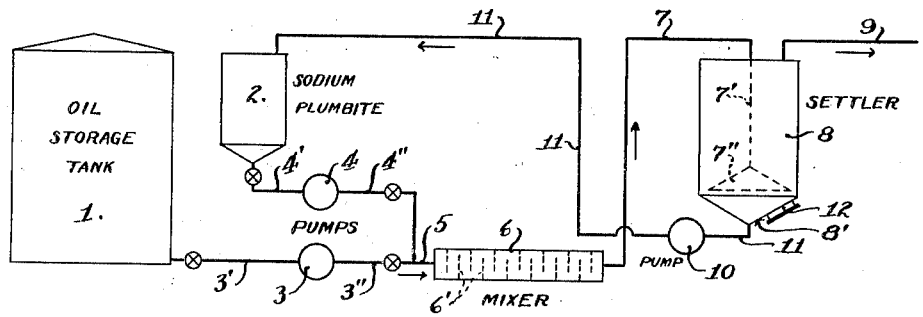
Figure 2:
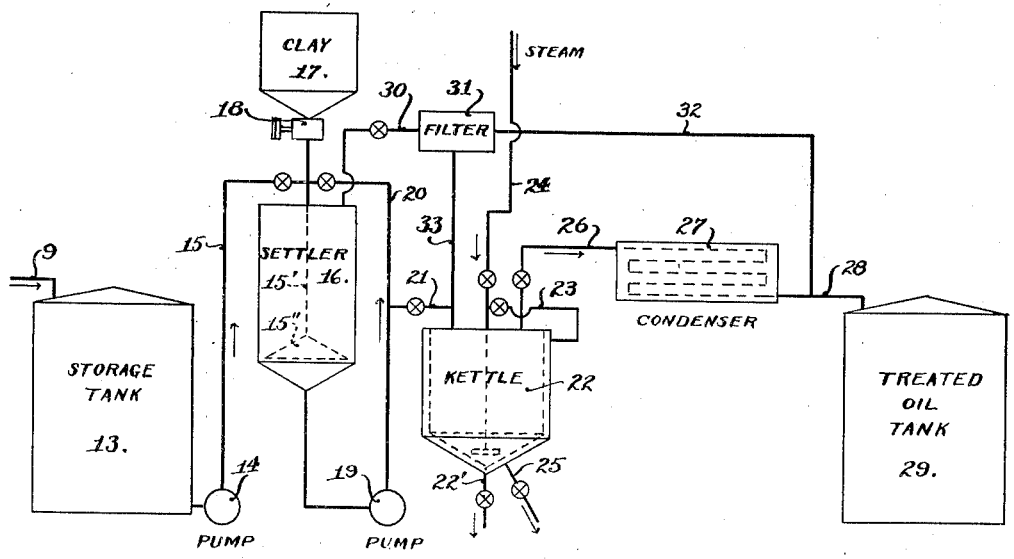

With this understanding I have accordingly in the accompanying drawings shown in Fig. 1 an apparatus by which the preliminary treatment, in order to remove the sulfur may be carried out. In Fig. 2 I have shown an essentially similar apparatus in which the clay treatment may be effected. In Fig. 3 I have shown the clay treatment apparatus developed to include a plurality of settler members, adapting it for a further novel feature, namely the carrying of the treating agent counter-current to the flow of the oil.

Referring to Fig. 1, the numeral 1 is a storage tank for the untreated distillate, carrying a percentage of sulfur which is to be removed. 2 is a reservoir for the sodium plumbite, which in this case, is the treating agent. In practise, this plumbite agent consists of a solution of approximately 20 degrees Baumé gravity caustic soda with litharge. 3 is a pump which by means of its controllable inlet pipe 3' takes the untreated distillate from tank 1 and delivers it through its controllable discharge pipe 3". 4 is a pump taking the plumbite solution from the reservoir 2 by means of its controllable inlet pipe 4' and delivering it through its controllable discharge-pipe 4". The distillate and the plumbite solution are taken in predetermined volumes, in practise, approximately 40 parts of the distillate and one part of the plumbite. The discharge pipes 3" and 4" preferably join in a common pipe 5, which delivers into a mixer 6 of suitable character, such, for example, as a closed vessel, here shown, provided with internal baffles 6', and commonly known as a turbulence mixer wherein intimate contact and thorough mixing of the distillate and plumbite are effected.

7 is the discharge pipe from the mixer 6. 8 is a closed settler into the top of which the discharge pipe 7 from the mixer enters, said pipe having an extension 7' passing down into the settler nearly to the level of the conical bottom 8' of said settler, said extension being at its lower end expanded to form a relatively extensive inverted funnel shaped foot 7". The function of this expanded foot is to prevent undue agitation of the delivered mixture of distillate and plumbite in the body of the settler, as the distillate passes upward to its outlet pipe 9. The plumbite settles to the bottom of the settler, and is drawn off by a pump 10 in a pipe line 11 which delivers it back to the reservoir 2 wherein its strength is restored for reuse.

12 is a sight glass to show the level of the settled plumbite in the bottom of the settler. The treated distillate, deprived of the sulfur passes off from the settler through the outlet pipe 9 to a suitable destination, which destination, when the treated distillate is to be further treated with clay, is the storage tank 13, of Fig. 2, to which reference must now be had.

In this Fig. 2, 13 is a storage tank for the distillate to be clay treated, said distillate being such as has been previously treated for the removal of sulfur, or a distillate which by being able to meet the doctor or corrosion test needs no previous treatment. 14 is a pump which delivers the distillate from tank 13 either intermittently or continuously, through a controllable pipe 15 and its extension 15′ with funnel foot 15″, to a settler 16.

17 is a reservoir for the decolorizing clay, which is delivered in powdered form through a controllable feeding device indicated at 18, to the extension 15′, so that the distillate and clay are thus delivered together, to the settler.

It will be noted that this settler 16 and its interior delivery extension 15′ are similar in form and function to the settler 8 and extension 7′ of Fig. 1, and it is only necessary to state that in settler 16, the clay settles out from the distillate, without undue agitation of the mixture. The settled clay is taken from the bottom of the settler by a pump 19, and is returned through a controllable pipe line 20 to the extension 15′ which is within the settler, thus keeping the clay in circulation. Or when it is desired to remove all or a portion of the spent clay from the process, it is taken from the pipe line 20 through a controllable pipe 21, and delivered to a steam jacketed kettle 22, the jacket of which is supplied with either saturated or superheated steam through a controllable steam connection 23 leading from a steam pipe 24 which admits live steam also to the kettle and into the body of clay therein.

In this steam kettle such distillate as the clay may carry is evaporated, and moreover, as the live steam admitted to the interior of the kettle condenses, boiling water results, which by contact with the clay assists in separating the distillate. For the heavier distillates a pressure above the atmosphere may be carried inside the steam kettle so that the required temperature for evaporation of the heavy distillates may be maintained.

When the distillate has evaporated from the clay, the latter is drawn from the kettle through its discharge pipe 22′, and the water of condensation from the jacket is drawn off by pipe 25. The distilled vapors rising from the kettle pass through the pipe 26 to the condenser 27, and thence through pipe 28 to the tank 29.

The main body of the distillate from the settler 16 passes out therefrom through the pipe 30 to the filter 31, from which, separated from the clay, it passes through pipe line 32 to the pipe 28 leading to the tank 29.

When the filter becomes overcharged with clay the excess is drawn off through the controllable pipe 33 and is delivered to the evaporating kettle 22.

For the treatment of distillate where more than one settler is used, reference is made to Fig. 3, in which like numerals are employed to designate parts similar to those in Fig. 2, in so far as they are applicable. Three settlers 16, 16′ and 16″ are here shown by way of example, though it is to be understood that any plurality may be used. The distillate to be treated is taken from tank 13 by the pump 14 and is delivered through pipe 15 and 15′ to the first settler 16. The distillate treated in this settler passes off through a controllable pipe 15$^a$ and 15$^{a\prime}$ and is delivered into the second settler 16′. From the latter is passes off through a further controllable pipe 15$^b$ and 15$^{b\prime}$ and is delivered into the third settler 16″. From the third settler it passes off through the pipe 30 to the filter 31, and thence, through the pipe line 32, to the tank 29. The clay from the reservoir 17 is delivered through the feed device 18 to mingle with the distillate entering the third settler 16″. The clay accumulating in this third settler is taken therefrom by the pump 19″ and may be delivered back through the pipe 20″ into the same settler 16″ for a given time, or only a part of it may be thus delivered and the remainder delivered counter-current through controllable pipe 20$^a$ to mingle with the distillate entering the second settler 16′. Similarly, by means of the pump 19′ the clay from the second settler 16′ may be delivered back through pipe 20′ into said second settler or part so delivered and the remainder delivered counter current through the controllable pipe 20$^b$ to mingle with the distillate entering the first settler 16.

The clay from the bottom of the first settler may all be passed by the pump 19 and pipe 20 back into the first settler or part of it may be thus passed back or the remainder or all of it may be passed through pipe line 21 to the evaporating kettle 22. Also by means of the controllable pipe line 34 the several settlers may be emptied and the contents distributed at will.

It will be seen that in the plural settler apparatus of Fig. 3, the operation carried out while essentially the same as in the single settler apparatus of Fig. 2, is a development of the latter in that greater efficiency is obtained by reason of the clay passing counter current to the flow of the distillate, and the mixing step taking place in each settler. The new clay coming in contact with the partially treated distillate has a greater clarifying effect than if it came in contact with distillate that had not been partially treated, with a result of getting both a better treated distillate and using less clay.

It may be here noted that a similar plurality of settlers may be used in the plumbite treatment of Fig. 1.

I claim:—

1. An apparatus for treating oils including a receptacle for the oil, a separate receptacle for the treating agent, a settler, means within the settler to prevent agitation, means for delivering the oil and treating agent from their respective receptacles to the settler, means for withdrawing the oil from the top of the settler, means for withdrawing the treating agent from the bottom of the settler, an evaporating kettle, means for delivering the withdrawn treating agent, at will, to said settler or to said evaporating kettle, means for withdrawing the evaporated product from the kettle, and means for withdrawing the unevaporated product from the kettle.

2. An apparatus for treating oils including a receptacle for the oil, a separate receptacle for the treating agent, a settler, means for delivering the oil and treating agent from their respective receptacles to the settler, means for withdrawing the oil from the top of the settler, a filter through which the withdrawn oil passes, a receptacle for receiving the treated oil, means for withdrawing the treating agent from the bottom of the settler, an evaporating kettle, means for delivering the withdrawn treating agent, at will, to said settler, or to said evaporating kettle, means for withdrawing the evaporated product from the kettle, a condenser and a conduit therefrom through which the evaporated product passes to the receptacle for the treated oil, and means for withdrawing the unevaporated product from the kettle.

3. An apparatus for treating oils including a receptacle for the oil, a separate receptacle for the treating agent, a settler, means for delivering the oil and treating agent from their respective receptacles to the settler, means for positively mixing the oil and treating agent prior to delivery to the settler, means for withdrawing the oil from the top of the settler, a receptacle for receiving the treated oil, means for withdrawing the treating agent from the bottom of the settler, a second settler, means for delivering the oil from the treated oil receptacle to the second settler, means for delivering a second treating agent with the treated oil into the second settler, means for withdrawing the oil from the top of the second mentioned settler, means for withdrawing the treating agent from the bottom of the second mentioned settler, means for redelivering the withdrawn treating agent to the second mentioned settler, an evaporating kettle, means for delivering the withdrawn treating agent from the second mentioned settler to the evaporating kettle, means for withdrawing the evaporated product from the settler, and means for withdrawing the unevaporated product from the kettle.

In testimony whereof I have signed my name to this specification.

ARTHUR F. L. BELL.